United States Patent
Lewis et al.

(10) Patent No.: US 7,747,004 B2
(45) Date of Patent: Jun. 29, 2010

(54) DEVICES AND METHODS FOR ACOUSTIC USABILITY

(75) Inventors: Ian P. Lewis, Grayslake, IL (US); Theodore R. Arneson, Ivanhoe, IL (US); Joel A. Clark, Woodbridge, IL (US)

(73) Assignee: Motorola, Inc., Schaumburg, IL (US)

( * ) Notice: Subject to any disclaimer, the term of this patent is extended or adjusted under 35 U.S.C. 154(b) by 1149 days.

(21) Appl. No.: 11/317,157

(22) Filed: Dec. 22, 2005

(65) Prior Publication Data

US 2007/0149259 A1 Jun. 28, 2007

(51) Int. Cl.
*H04M 1/00* (2006.01)
*H04M 9/00* (2006.01)

(52) U.S. Cl. .............................. 379/433.13; 379/433.02

(58) Field of Classification Search ............ 379/433.11, 379/433.13, 433.02; 455/550.1, 556.2, 556.1, 455/569.1, 575.1, 575.3, 575.6
See application file for complete search history.

(56) References Cited

U.S. PATENT DOCUMENTS

| | | | |
|---|---|---|---|
| 5,461,672 A * | 10/1995 | Enokido et al. ........ | 379/433.02 |
| 5,537,572 A | 7/1996 | Estevez-Alcolado et al. | |
| 5,909,490 A * | 6/1999 | Sokolich et al. ........ | 379/433.02 |
| 5,963,640 A * | 10/1999 | Rabe ..................... | 379/433.02 |
| 6,134,336 A | 10/2000 | Clark | |
| 6,292,563 B1 * | 9/2001 | Clark et al. ............ | 379/433.13 |
| 6,324,386 B1 * | 11/2001 | Headon .................. | 455/575.3 |
| 6,337,908 B1 | 1/2002 | Andersen | |
| 7,636,124 B2 * | 12/2009 | Yoo et al. .................... | 348/373 |
| 2002/0061770 A1 * | 5/2002 | Ozaki ......................... | 455/566 |
| 2002/0068619 A1 * | 6/2002 | Nagai .......................... | 455/575 |
| 2002/0102946 A1 * | 8/2002 | SanGiovanni ................ | 455/90 |
| 2004/0110529 A1 * | 6/2004 | Watanabe et al. ......... | 455/550.1 |

FOREIGN PATENT DOCUMENTS

GB      2 359 690 A      8/2001

* cited by examiner

*Primary Examiner*—Fan Tsang
*Assistant Examiner*—Phylesha Dabney
(74) *Attorney, Agent, or Firm*—Gary J. Cunningham

(57) ABSTRACT

Disclosed is a mobile communication device and a method including a first housing including a first side and a second side, a display coupled to the first side of the first housing and a second housing movably coupled to the first housing, the second housing being coupled against the second side of the first housing when the second housing is in a closed position and extending the first side of the first housing when the second housing is in an open position.

11 Claims, 3 Drawing Sheets

DEVICES AND METHODS FOR ACOUSTIC USABILITY

FIELD

The present technology relates to acoustic usability of mobile communication devices, and more particularly to a deployable member with acoustic characteristics for directing sound to an ear of a user.

BACKGROUND

Mobile communication devices are increasingly popular for communication and other tasks. As their functionality has increased, larger display screens on smaller devices are in demand. In devices with large displays, the acoustic interface is closely positioned between the display and the top of the device housing. The acoustic interface, including an earpiece transducer and its associated earpiece port, may be only a few millimeters from the top of the housing and from the display.

To listen, a user may press the device's earpiece port to his or her ear. However, the sound from the acoustic interface may suffer from acoustic leakages as the sound dissipates away from the user's ear from the area near the top of the device housing. That is, since the earpiece port is very close to the top of the device, sound may travel beyond the top of the device, and not in the direction of the user's ear. Additionally, ambient noise may reach the user's ear from the area near the top of the device housing, making sound from the earpiece port more difficult to hear in some environments. Due to the location of the acoustic interface, it can be difficult to seal the earpiece to the user's ear to avoid acoustic leakages. Accordingly, the user may perceive the sound from the acoustic interface as too quiet.

For the mobile communication device's earpiece to be tolerant of large acoustic leakages, the acoustic system may need to generate very large acoustic pressures at low frequencies, which may be difficult as the devices become increasing smaller. For example, for smaller devices, there may be a trend toward smaller acoustic transducers instead of larger transducers.

In addition to acoustic leakage problems, a mobile communication device with an acoustic interface crowded between the top of the display and the top of the device housing may also incur user comfort problems. For example, positioning the acoustic interface at top of the device against an ear may cause some users discomfort.

Thus, there is a need for the enhancement of the quality, performance and comfort of the acoustic interfaces for mobile communication devices with large displays.

SUMMARY

Disclosed is a mobile communication device and a method including a first housing including a first side and a second side, a display coupled to the first side of the first housing and a second housing movably coupled to the first housing, the second housing being coupled against the second side of the first housing when the second housing is in a closed position and extending the first side of the first housing when the second housing is in an open position.

DETAILED DESCRIPTION

Figure 1:
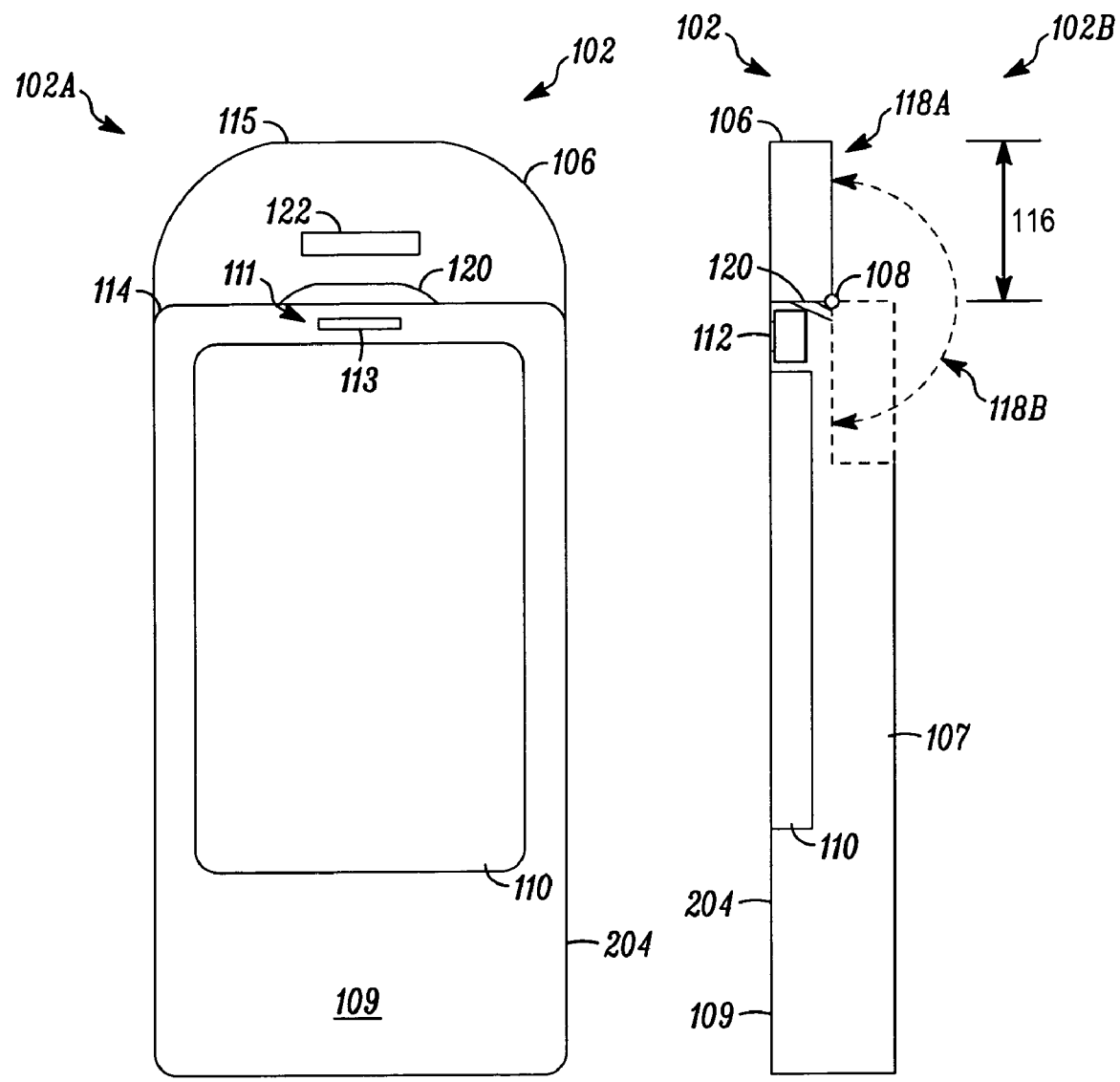
FIG. 1 depicts an embodiment of a mobile communication device, and in particular, a cellular telephone in a front view and a side view.

In a mobile communication device the second housing may be positioned up to effect a continuation of the front face of the main housing. That is, in the open position, the second housing can increase the effective area occupied by acoustic interface or earpiece port. The second housing or member hereinafter is referred to as the "flip." In its open position, the acoustic properties of the flip may increase the loudness perceived by the user by helping to control acoustic leakage. The flip also may contain acoustic features such as passive or active ports to help optimize the acoustic performance of the device's acoustic interface. The flip further may provide a comfortable seating for the user's ear.

Before describing in detail embodiments that are in accordance with the present disclosure, it should be observed that the embodiments reside primarily in combinations of method steps and components related to directing sound from the acoustic interface of a mobile communication device to a user's ear. Accordingly, the components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Methods and means for practicing the technology of the present disclosure are described herein. Further, it is expected that one of ordinary skill, notwithstanding possibly significant effort and many design choices motivated by, for example, available time, current technology, and economic considerations, when guided by the concepts and principles disclosed herein will be readily capable of practicing the disclosed technology for directing sound from the acoustic interface of a mobile communication device to a user's ear with minimal experimentation.

FIG. 1 depicts an embodiment of a mobile communication device 102, and in particular, a cellular telephone. The mobile communication device 102 represents a wide variety of communication devices that have been developed for use within various networks. Such handheld communication devices include, for example, cellular telephones, messaging devices, mobile telephones, personal digital assistants (PDAs), notebook or laptop computers incorporating communication modems, mobile data terminals, application specific gaming devices, video gaming devices incorporating wireless modems, and the like. Any of these portable devices 102 may be referred to as a mobile station or user equipment. A front view of the mobile communication device 102 is illustrated by the embodiment 102(a) and a side view is illustrated by 102(b).

The main housing 104 and the flip 106 can be coupled by, for example, a mechanical connection or coupling mechanism 108. As discussed above, a display 110 can be coupled to the front side 109 of the main housing 104. The acoustic interface 111 can include an earpiece transducer 112 and its associated earpiece port 113 and can be positioned between the display 110 and the top 114 of the main housing 104. The term "top" is only used in a relational sense to indicate the portion of the mobile communication device 102 that is typically coupled to the ear of the user. For example, the acoustic interface 111 may be located on the opposite side of the display 110 from a keypad or microphone that may also be on the front side 109 of the main housing 104.

As shown, the flip 106 can be in an at least partially open position 118(a), effectively elongating the top 114 of the main housing 104. That is, in an open position 118(a) the front side 109 of the main housing 104 is extended by the flip's 106 length 116. Accordingly, the effective distance or length of the device 102 is longer when the flip 106 is in the at least partially open position 118(a) than when the flip 106 is in the closed position 118(b). The top of the device 102 effectively becomes the top 115 of the flip 106. Additionally, the flip 106 may be configured so that when the acoustic interface 111 is positioned against an ear of a user, sound from the earpiece transducer 112 can be redirected by the flip 106 from the top 114 and/or over the top 114 of the device to the user's ear.

As depicted in FIG. 1, the earpiece port 113 can be positioned close to the top 114 of the main housing 104. For example, in one embodiment the earpiece port 113 can lie substantially in a range between approximately 0.1 mm and approximately 9 mm from the top 114 of the main housing 104. In another embodiment, the length 116 of the flip 106 from the top 114 of main housing 104 can be less than approximately 25 mm.

The side view of the mobile communication device 102(b) depicts that the flip 106 can move from a first position 118(a) to a second position 118(b). The first position 118(a) can be at least partially open and the second position 118(b) can be substantially closed. That is, in a closed position 118(b) the flip 106 can be coupled against the back side 107 of the main housing 104. In the second or closed position 118(b), the flip 106 can be flush, aligned, parallel, and/or located in a housing recess on the back 107 of the main housing 104. In this manner, when the mobile communication device 102 is not in use and the flip 106 is in its closed position 118(b), the length of the device can be substantially just that of the main housing 104. Accordingly, the flip 106 can be movably coupled to the back side 107 of the main housing 104 in its closed position 118(b).

In another embodiment, the flip 106 in its closed position 118(b) can be aligned with the top 114 of the device 102. Typically, a mobile communication device such as a cellular telephone can be between 5-20 mm thick. In one embodiment, a flip 106 may have a length of at least approximately 6 mm to extend the effective length of the device 102 by that amount. It is understood that any size configuration of the flip 106 is within the scope of this discussion.

The coupling mechanism 108 between the main housing 104 and the flip 106 can be any type. The coupling mechanism 108 can, for example rotate, translate, slide or actuate a spring to deploy the flip 106 into an open position 118(a). In one embodiment, the coupling mechanism 108 can include a spring so that when the flip 106 is in its partially open position 118(a), the coupling mechanism 108 may provide the flip 106 with tension against the ear of the user. For example, in that embodiment, the strength of the tension of the coupling mechanism 108 may provide at least a flexible seal between the device 102 and a user's ear. The flip 106 and/or coupling mechanism 108 may also include a mechanical latch to maintain its open position 118(a). It is understood that any coupling mechanism 108 between the main housing 104 and the flip 106 is within the scope of this discussion.

The flip 106 may also include a contour. By ergonomically contouring the flip 106, the flip 106 may be more comfortable against a user's ear than were the flip 106 flat in form. Contouring may also help provide a flexible seal between the device 102 and the user's ear. The flip 106 can be of any suitable thickness and height. It is understood that any form or size for the flip 106 is within the scope of this discussion.

Positioning the flip 106 in at least a partially open position 118(a) may help direct acoustic signals from the earpiece transducer 112 toward the user's ear. The flip 106 can contain acoustic characteristics or features that can help optimize the acoustic performance of the acoustic interface 111. For example, directing acoustic signals from the transducer port 113 can be aided by the inclusion of one or more acoustic ports 120 and/or 122 in the flip 106 and/or in the main housing 104. In one embodiment, one or more ports 120 and/or 122 can be positioned so that a port 120 and/or 122 can line up with the entrance to the ear canal of a user when the mobile communication device 102 is held against the user's head.

While FIG. 1 depicts two positions for passive or active ports 120 and/or 122, it is understood that any type of suitable ports are within the scope of this discussion. The acoustic porting 120 and/or 122 can also be separate from the main housing 104 or coupled to the main housing 104. The acoustic porting 120 and/or 122 can be located in the flip 106 in any suitable location and/or configuration. The frequency response tuning of the device may or may not include screen material over the ports 120 and/or 122. In any event, for acoustic coupling, a passive port 120 and/or 122 can allow an acoustic signal from the earpiece port 113 and its associated transducer 112 to come back through the ports 120 and/or 122 or be directed off the flip 106 toward the user's ear, preferably avoiding a change of frequency response due to differences in coupling.

The flip 106 with or without ports 120 and/or 122 can accordingly direct acoustic signals and acquire gain by controlling acoustic leakage between the main housing 104 and the ear. Moreover, the flip 106 with or without ports 120 and/or 122 accordingly may help direct acoustic signals and reduce the otherwise free field dispersion of acoustic signals between the main housing 104 and the ear.

Figure 2:
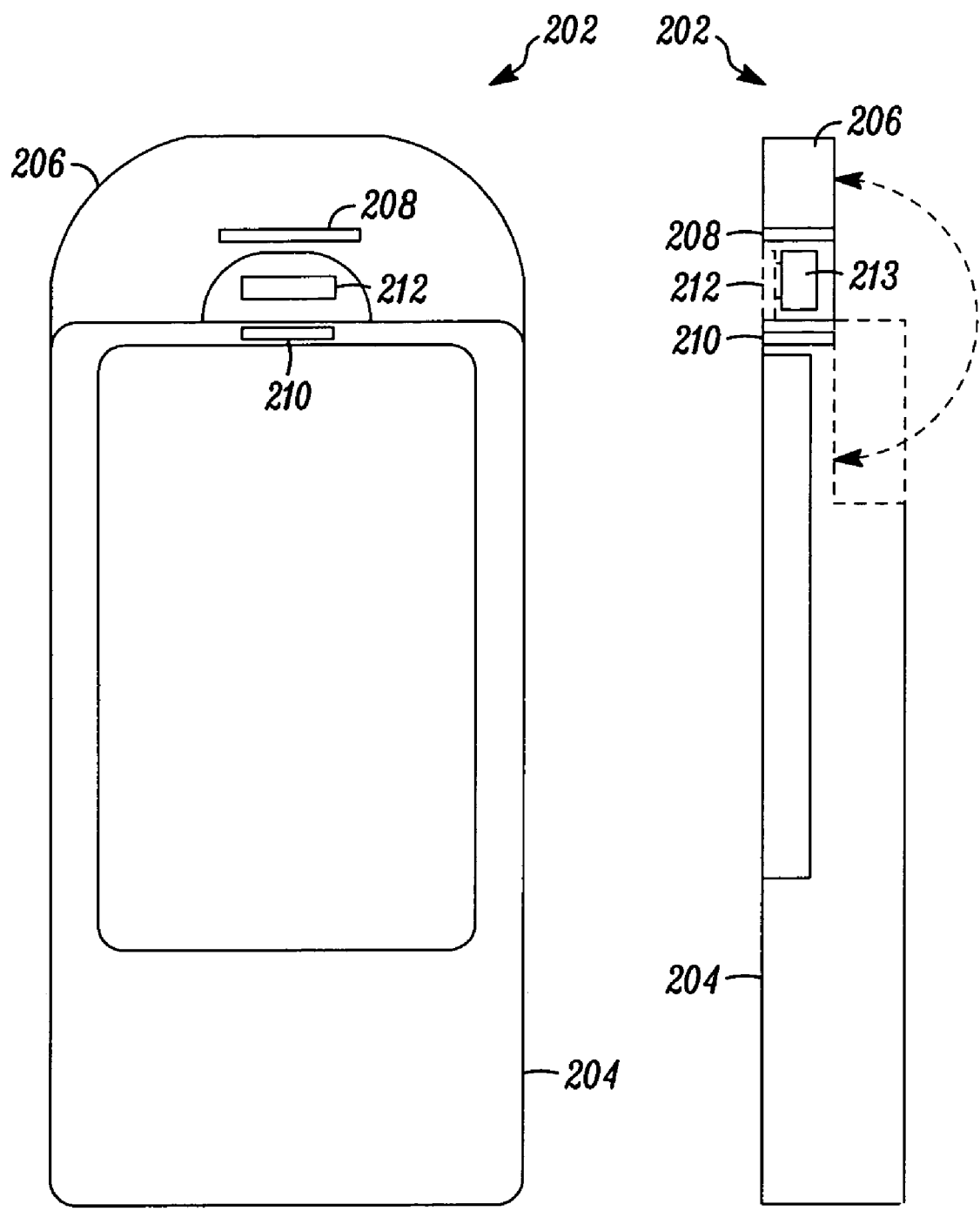
FIG. 2 depicts another embodiment of the mobile communication device where an earpiece port and its associated transducer are located within the flip.

FIG. 2 depicts an embodiment of a mobile communication device 202 where an earpiece active port 212 and its associated transducer 213 are located within the flip 206. In one embodiment, passive or active porting 208 can be also located in the flip 206. In another embodiment, passive or active porting 210 can be located in the main housing 204. It is understood that any type that the porting may take any suitable form as noted above.

Figure 3:
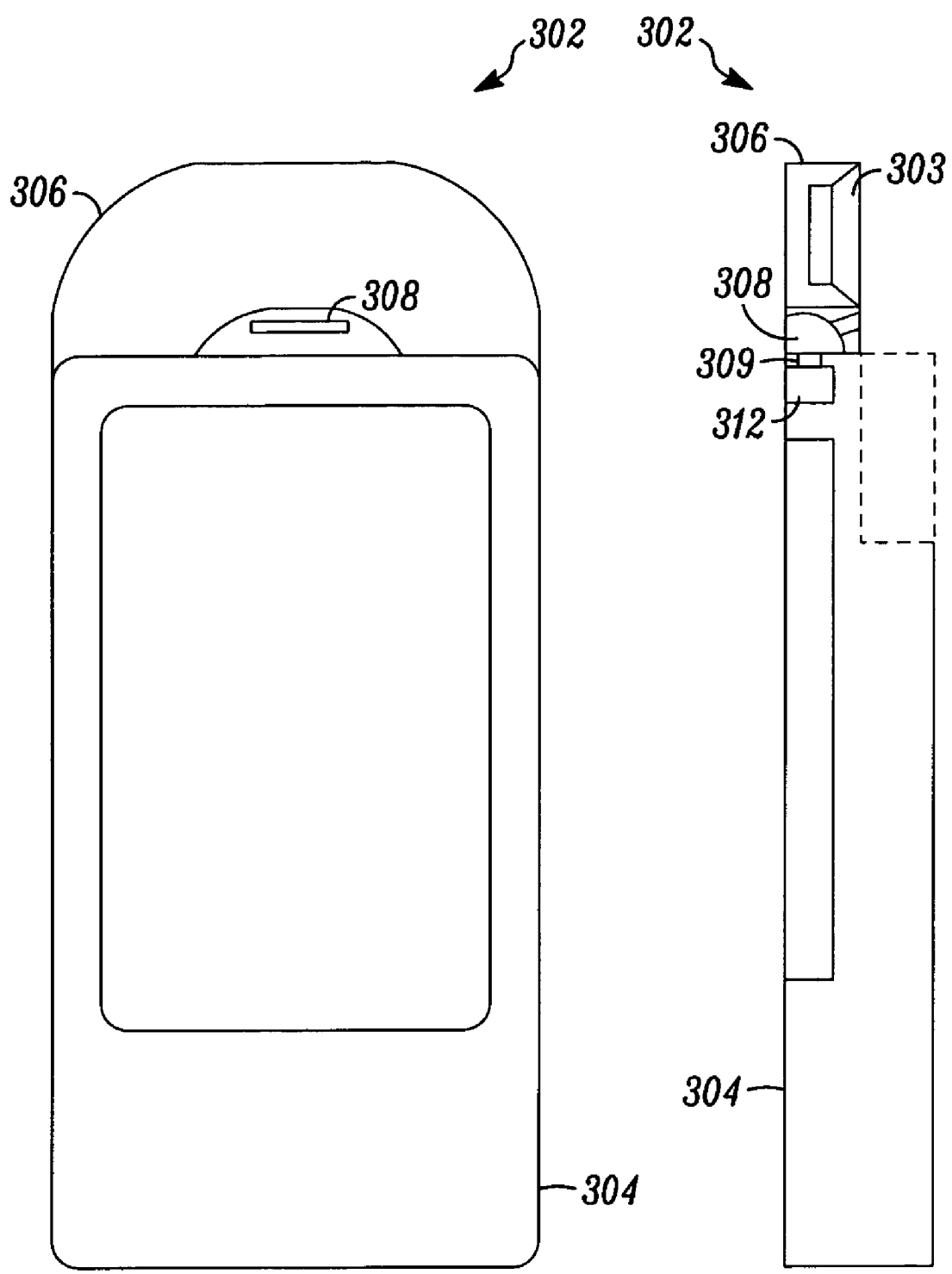
FIG. 3 depicts another embodiment of the mobile communication device where the flip may include a loudspeaker or other component(s) sealed or unsealed in a cavity.

FIG. 3 depicts an embodiment of a mobile communication device 302 where the flip 306 may optionally include a loudspeaker 303 sealed or unsealed in a cavity. In one embodiment with a loudspeaker 303 embedded in the flip 306, the flip 306 can be less than, equal to, or exceed 25 mm in length depending on the size of the loudspeaker 303. In any event, without the loudspeaker 303, the flip 306 can be any length as well.

Passive porting 308 in flip 306 is also depicted in FIG. 3. The transducer 312 in FIG. 3 can be located in the main housing 304 as can be additional active porting 309. It is understood that any type of component(s) can be located in the flip, sealed or unsealed and that the porting may take any suitable form as noted above.

The various possible configurations of the above-described mobile communication devices may provide a user the benefit of modifying earpiece acoustics in a mobile communication device having an earpiece transducer and an associated earpiece port by deploying into an at least partially open position the flip that can be coupled to a back side of the mobile communication device. Furthermore, the user may benefit by moving the flip from a closed position on the back side to the at least partially open position and positioning the earpiece port against the user's so that sound from the earpiece transducer can be redirected from the flip to the ear of the user. By configuring the flip with one or more acoustic ports the user may benefit by further redirecting the sound to the ear of the user.

The flip may be deployed by rotating the flip from the closed position to the at least partially open position. In this way, the flip is adapted to increase the effective distance of the earpiece port from the top of the mobile communication device by deploying the flip into the at least partially open position.

While the figures illustrate a number of embodiments having various configurations, the different embodiments share the characteristic that the flip as described herein may enhance the quality, performance and comfort of the acoustic interfaces for mobile communication devices with large displays.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally and equitable entitled.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A mobile communication device comprising:
   a first housing including a first side and a second side having a recess;
   a display coupled to the first side of the first housing;
   an acoustic interface including an earpiece transducer having a port on a first side, positioned between the display and a top of the first housing; and
   a second housing movably coupled to the first housing, the second housing being coupled against and at least partially received in the recess of the second side of the first housing, and the second side and the second housing being flush when the second housing is in a closed position, and extending the first side of the first housing when the second housing is in an open position,
   wherein the second housing includes acoustic characteristics for directing acoustic signals to an ear of a user of the mobile communication device when the second housing is in at least a partially open position.

2. The mobile communication device according to claim 1, further comprising: an earpiece transducer located in the first housing and having an associated earpiece port on the first side, the earpiece port having an effective distance from the top of the mobile communication device, wherein the effective distance is larger when the second housing is in the at least partially open position than when the second housing is in the closed position.

3. The mobile communication device according to claim 1, wherein directing acoustic signals comprises acquiring gain by controlling acoustic leakage between the first housing and the ear.

4. The mobile communication device according to claim 1, wherein directing acoustic signals comprises reducing free field dispersion of acoustic signals between the first housing and the ear.

5. The mobile communication device according to claim 1, further comprising a spring loaded hinge configured to assist maintaining the second housing in the at least partially open position.

6. The mobile communication device according to claim 1, wherein the earpiece port being located a distance from the top of the first housing, the distance being substantially in a range between approximately 0.1 mm and approximately 9 mm.

7. The mobile communication device according to claim 1, wherein the first housing has a top and the second housing has a length from the top of the first housing when the second housing is in an open position, and the length of the second housing from the top of first housing is less than approximately 25 mm.

8. The mobile communication device according to claim 1, wherein the second housing is configured with at least one acoustic port.

9. A mobile communication device, comprising:
   a housing including a first side, a top, and a second side having a recess;
   a display coupled to the first side of the first housing;
   an acoustic interface including an earpiece transducer having a port on a first side, positioned between the display and a top of the first housing;
   a flip member coupled to the second side of the housing in a closed position, the flip member being coupled against and at least partially received in the recess of the second side of the first housing, and the second side and the flip member being flush when the second housing is in a closed position, and extending the first side of the first housing when the flip member is in an open position.

10. The mobile communication device according to claim 9, wherein the flip member has a length beginning from the top of the housing when the flip member is in an open position, and the length of the flip member is less than approximately 25 mm.

11. The mobile communication device according to claim 9, further comprising an acoustic port located in the flip member.

* * * * *